May 17, 1938. L. E. WELLS 2,117,382
STORAGE BATTERY SEPARATOR
Filed Dec. 14, 1936 2 Sheets-Sheet 1
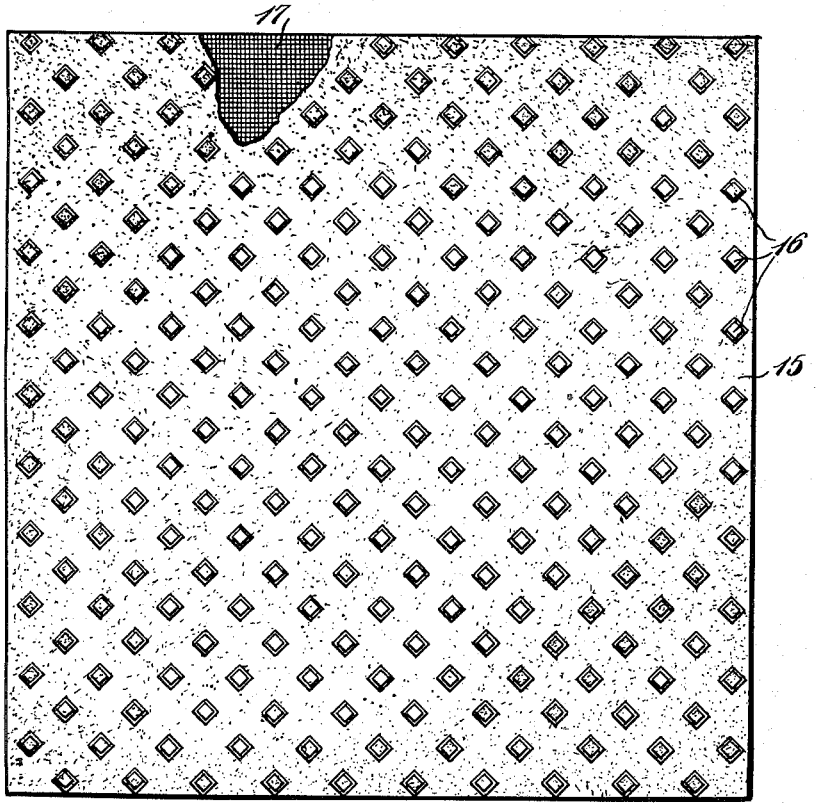
FIG. 1
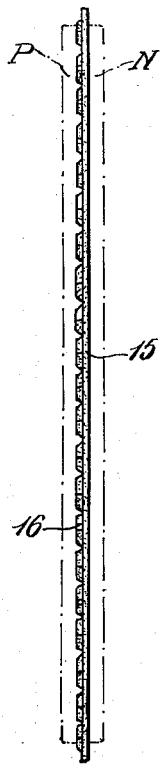
FIG. 2
FIG. 3 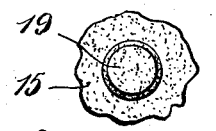 FIG. 5
FIG. 4 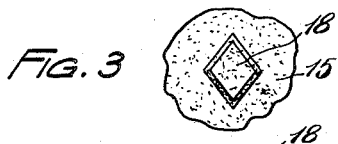  FIG. 6
FIG. 9 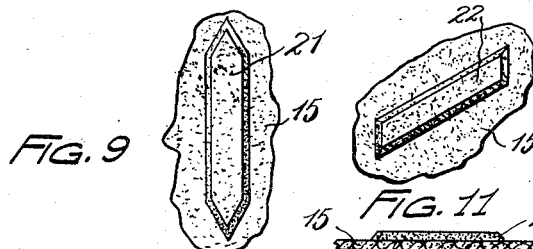 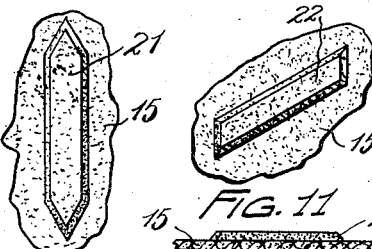 FIG. 7
FIG. 10  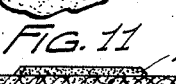 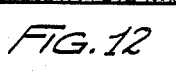 FIG. 8
FIG. 12
INVENTOR.
LELAND E. WELLS
BY Kwis Hudson & Kent
ATTORNEYS May 17, 1938. L. E. WELLS 2,117,382
STORAGE BATTERY SEPARATOR
Filed Dec. 14, 1936 2 Sheets-Sheet 2

INVENTOR.
LELAND E. WELLS
BY Kwis Hudson & Kent
ATTORNEYS

Patented May 17, 1938

2,117,382

UNITED STATES PATENT OFFICE 2,117,382

STORAGE BATTERY SEPARATOR

Leland E. Wells, Cleveland Heights, Ohio, assignor to Willard Storage Battery Company, Cleveland, Ohio, a corporation of West Virginia Application December 14, 1936, Serial No. 115,765

4 Claims. (Cl. 136—143)

This invention relates to storage battery separators and has for its object to provide a separator which is more satisfactory than the commonly employed separators having vertical ribs or the equivalent of vertical ribs formed by corrugations.

With separators of the usual ribbed type the plane or flat portion bears against the negative plate and the edges of the ribs bear against the positive plate in spaced vertical lines, thus providing for vertical movement or circulation of the electrolyte and the oxygen which is evolved at the surface of the positive plate. This type of separator has numerous objections among which may be mentioned that the flat portion or body of the separator is likely to sag or buckle between the ribs since this portion is unsupported from the top to the bottom of the separator, with the result that it does not, to the extent desired, perform its intended function of retaining the active material of the negative plate in place; the active material of the positive plate is left unsupported between the ribs for the full height of the plate; the vertical ribs do not allow, to the extent desired, the free circulation of electrolyte; and, finally, the continuous upright ribs add considerably to the resistance of the separator and therefore increase the internal resistance of the battery.

In accordance with the present invention, instead of using continuous ribs I employ discontinuous members or isolated lugs so spaced over the surface of the plate that they provide a more uniform support for the flat portion or body of the separator and also permit free circulation of the electrolyte laterally as well as vertically. This may be accomplished by providing on the side or face of the separator body isolated lugs of square, round, diamond-shape or other shape uniformly spaced both horizontally and vertically or elongated members forming in effect staggered discontinuous ribs all of which are so shaped as to prevent the piling up thereon of active material which may be shed from the plates or the trapping of gas bubbles beneath the same.

The invention may be further briefly summarized as consisting in certain novel details of construction which will be described in the specification and set forth in the appended claims.

In the accompanying sheets of drawings,

Fig. 1 is a face view of a separator looking toward the side having isolated projections which are adapted to engage a positive plate of the battery, substantially square lugs being here shown;

Fig. 2 is an edge view of the same showing by dotted lines an adjacent pair of plates of opposite polarity which the separator is designed to engage and separate or to maintain in predetermined spaced relation;

Figure 13:
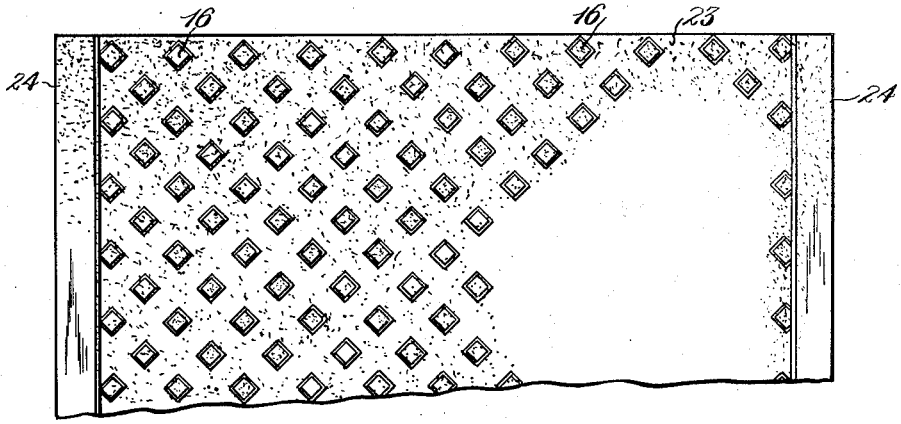
Figure 14:
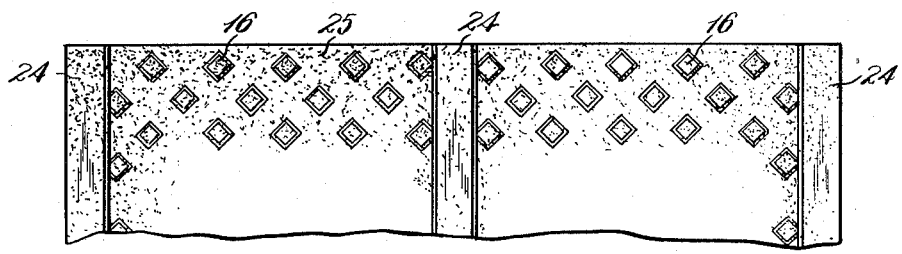

Figs. 3, 5, 7, 9, and 11 are fragmentary face views on an enlarged scale showing modifications wherein differently shaped lugs or discontinuous ribs are employed;

Figs. 4, 6, 8, 10, and 12 are fragmentary sectional views of the separators of Fig. 3, 5, 7, 9, and 11, respectively; and Figs. 13 to 16 are fragmentary face views of slightly modified forms of separators embodying my invention.

Referring now to the drawings, 15 represents the body or flat portion of the separator the rear plane side of which is adapted to engage or lie flat against the surface of a negative plate while the opposite side is provided with isolated lugs or discontinuous members which are designated 16 in Figs. 1 and 2, and the faces of which are adapted to engage the side of the adjoining positive plate of the battery. In Fig. 2 I have indicated the positive and negative plates by dotted lines, the positive plate being designated P and the negative plate N. It is desirable, of course, that the lugs 16 be integral with the body 15 of the separator and both the body 15 and the lugs 16 may be made of any suitable separator material which is pervious to the electrolyte and inert in the battery. Generally, the separator is made in whole or in part of porous initially plastic molded material so that the isolated members 16 may be molded integral with the body, microporous rubber being preferred, in which case they will be made in accordance with the teachings of the Beckmann Patents Nos. 1,745,657 and 1,831,-406, or in accordance with the process shown in my pending application Serial No. 11,842.

If formed in accordance with my prior application, the body of the separator will include a layer of open weave porous fabric 17, such as cotton fabric, embedded in a body of microporous rubber, or, otherwise stated, the open weave fabric has its interstices filled and both sides coated with thin layers of microporous rubber with the lugs or discontinuous ribs also of microporous rubber and formed integral with the microporous rubber layer on one side of the fabric strip or sheet. Of course, the fabric strip may be omitted, in which event the body of the separator as well as the lugs or discontinuous ribs will be formed uniformly of microporous rubber. However, the separator may be formed of any other inert porous material, but, in all instances, whether formed of microporous rubber or not and regardless of the shape of the lugs or discontinuous ribs, the latter preferably will be formed integral with the body of the separator and will have the same porosity as the latter. The separator may be molded or formed to size or substantially to size, but, if made in accordance with my prior application, a sheet or strip of the separator material of indeterminate length and convenient width will be formed, and from this sheet or strip separators will be cut to size.

The lugs 16 of Figs. 1 and 2 are in vertical rows with the lugs of each row spaced a suitable distance from each other and from the lugs of the adjacent rows but are in staggered relation thereto so as to have an entirely uniform spacing when the lugs are viewed from the front, as in Fig. 1. It will be seen that I place the means for supporting the plane portion of the separator at points equally disposed in every direction so that the supporting means is uniformly distributed rather than confined to narrow vertically disposed portions. That is to say, viewing the separator either from the top or from either side, there will be many more lines of support although discontinuous than in common practice with the separators now in use, and these, whether viewed from the top or side, are similarly spaced and located and equally open for the circulation of electrolyte in all directions along or parallel to the plane of the separator. This results in a freer movement of the electrolyte and also a more ready means of egress for the gas evolved during charging than is the case with separators having the usual continuous vertical ribs.

Perhaps the chief advantage lies in the fact that the symmetrically arranged supports for the back or body portion of the separator prevents the buckling or sagging which at times occurs between the ribs of the commonly employed separators and results in better retention of the active material of the plate bearing against the body of the separator. Additionally, with the uniformly spaced but discontinuous supports, although in reality a better supporting action is obtained for the plane portion or body of the separator than is the case with the continuous vertical ribs having a thickness and spacing dictated by the requirements of good storage battery practice, actually less rib or spacer material is employed in the isolated members 16 than is the case when continuous ribs are employed, and therefore the separator has lower resistance and there is also an increase in acid space without in any way increasing the bulk of the battery.

Obviously, the isolated supporting and spacing lugs or discontinuous members 16 need not be square as shown in Fig. 1 but may assume many other shapes, such as the diamond shape illustrated at 18 in Fig. 3; the round shape illustrated at 19 in Fig. 5; the partly diamond and partly round shape illustrated at 20 in Fig. 7; the elongated style lug illustrated at 21 in Fig. 9; or the elongated inclined lug illustrated at 22 in Fig. 11. The lug or discontinuous rib shown in Fig. 9 is of elongated rectangular shape with pointed ends, and these discontinuous ribs will be vertically disposed on the separator. The lug or discontinuous rib shown in Fig. 11 is substantially similarly shaped but these lugs will be inclined on the separator, this type of discontinuous rib being desired where lateral support for the body of the separator is preferable to the vertical support obtained with vertically disposed discontinuous ribs such as shown in Fig. 9.

In all the shapes herein illustrated, the tops and bottoms of the lugs or discontinuous spacing members are neither reentrant nor square so that there is no likelihood of active material which is shed from the positive plate lodging on top of the lugs or discontinuous ribs or of gas being trapped below the latter. Any shape is suitable (1) which permits the fall of the positive active material after the same is loosened from the plate surface without retaining any of such material on the lugs or rib portions, (2) which permits the ready egress of gas without any bubbles being trapped below the lugs or rib portions, (3) which provides for free circulation of electrolyte in all directions on and parallel to the flat surface of the body of the separator, and (4) which provides a support for the body of the separator without leaving any portion of sufficient size unsupported that it is likely to sag or buckle between the points of support.

Figures 15, 16:
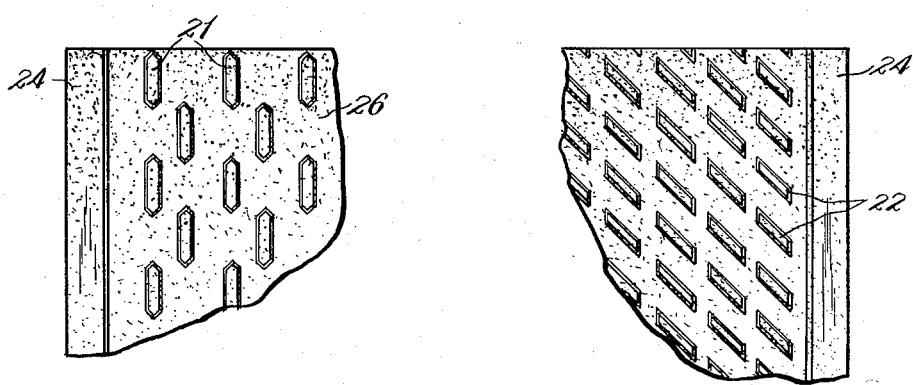

It may be desirable that separators having discontinuous lugs or ribs be provided also with continuous vertical ribs, as, for example, continuous ribs along the vertical edges. Such a separator is shown at 23 in Fig. 13, this separator having isolated lugs which in this instance are shaped and spaced as in Fig. 1 and having along its upright side edges vertical ribs 24. The separator may have one or more vertical continuous ribs otherwise arranged, as, for example, between the edge ribs 24, and in Fig. 14 the separator, which is designated 25, has, in addition to the ribs 24 along its vertical edges, a central vertical rib. In Fig. 15 I have shown at 26 a portion of a separator the body of which is provided with the elongated lugs 21 of Fig. 9, this separator being provided with vertical edge ribs one of which is shown at 24. Fig. 16 is a view similar to Fig. 15 but shows the discontinuous ribs 22 of the type shown in Fig. 11. Here again the separator is provided with vertical side edge ribs one of which is shown at 24. Of course, with separators having the elongated discontinuous ribs of these figures it is optional whether they are provided also with two or more continuous vertical ribs.

The continuous vertical ribs may be porous and may be molded or formed integral with the body of the separator the same as the discontinuous lugs or ribs, or they may be formed of porous or non-porous material vulcanized or otherwise secured to the face of the body of the separator. In any event, these vertical continuous ribs are adapted to engage the face or side of the adjacent battery plate the same as the isolated lugs or discontinuous ribs, and therefore will be of the same height or thickness as the latter.

I do not desire to be confined to any of the details herein illustrated as the same are illustrative only of the many shapes and arrangements of discontinuous isolated supports with which the face of the separator may be provided, the same being employed with or without vertical continuous ribs, and I therefore aim in my claims to cover all modifications which do not involve a departure from the spirit and scope of my invention in its broadest aspects.

Having thus described my invention, I claim:
1. In a storage battery having positive and negative plates, a separator between the plates having discontinuous isolated members arranged substantially uniformly over one face thereof and projecting therefrom into engagement with one of said plates.

2. In a storage battery having positive and negative plates, a separator between the plates comprising a porous body portion having discontinuous isolated members arranged substantially uniformly over one face thereof and projecting therefrom into engagement with one of said plates.

3. In a storage battery having positive and negative plates, a separator between the plates comprising a body portion having substantially uniformly and substantially symmetrically arranged isolated discontinuous members projecting from one face thereof and engaging one of said plates, said members being formed integral with the body portion and both said members and said body portion being porous.

4. In a storage battery having positive and negative plates, a separator between the plates comprising a body portion having upright ribs and having between the ribs substantially uniformly arranged isolated discontinuous members projecting from one face of the body portion and engaging one of said plates, the ribs and said members being of substantially the same height.

LELAND E. WELLS.